United States Patent
Akiyama et al.

(10) Patent No.: US 9,110,411 B2
(45) Date of Patent: Aug. 18, 2015

(54) FIXING MEMBER MANUFACTURING METHOD AND FIXING MEMBER MANUFACTURING APPARATUS

(71) Applicant: CANON KABUSHIKI KAISHA, Tokyo (JP)

(72) Inventors: Naoki Akiyama, Toride (JP); Hiroto Sugimoto, Toride (JP); Yasuhiro Miyahara, Tokyo (JP); Yoshiaki Yoshida, Toride (JP); Jun Miura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 29 days.

(21) Appl. No.: 14/060,936

(22) Filed: Oct. 23, 2013

(65) Prior Publication Data

US 2014/0116611 A1 May 1, 2014

(30) Foreign Application Priority Data

Oct. 29, 2012 (JP) .................... 2012-237944

(51) Int. Cl.
*B29C 65/00* (2006.01)
*B32B 37/00* (2006.01)
(Continued)

(52) U.S. Cl.
CPC ........ *G03G 15/2017* (2013.01); *G03G 15/2057* (2013.01); *B29C 63/18* (2013.01);
(Continued)

(58) Field of Classification Search
CPC .... B29C 65/18; B29C 65/48; B29C 65/4835; B29C 66/5221; B29C 66/52272; B29C 66/71; B29C 66/712; B29C 63/00; B29C 63/18; B29C 63/0047; B29C 63/0069; B29C 2063/485; B32B 1/08; B32B 15/06; B32B 37/00; B32B 37/12; B32B 37/1207; G03G 15/2017; G03G 15/2057; B29L 2031/324; B29L 2023/00; B29L 2023/22; B29D 99/0035

USPC .......... 156/60, 160, 165, 229, 250, 267, 290, 156/291, 293, 294, 295, 296, 303.1, 349, 156/350, 358, 391, 423, 494, 510, 538, 539, 156/556, 574, 578, 580, 581, 583.1
See application file for complete search history.

(56) References Cited

U.S. PATENT DOCUMENTS

2009/0092426 A1 * 4/2009 Nishizawa et al. ........... 399/331
2013/0202333 A1 8/2013 Sugimoto

FOREIGN PATENT DOCUMENTS

JP 2002036360 A * 2/2002 .............. B29C 63/18
JP 2004-276290 A 10/2004

OTHER PUBLICATIONS

Miyahara et al., U.S. Appl. No. 14/063,234, Oct. 25, 2013.
(Continued)

*Primary Examiner* — Philip Tucker
*Assistant Examiner* — Brian R Slawski
(74) *Attorney, Agent, or Firm* — Fitzpatrick, Cella, Harper & Scinto

(57) ABSTRACT

A fixing member manufacturing method includes: a step of coating an outer peripheral surface of an elastic material with an adhesive; a step of externally fitting a resin tube around the elastic material coated with the adhesive; a step of temporarily fixing the resin tube onto the elastic material by heating the resin tube at a longitudinal end portion; a step of temporarily fixing the resin tube onto the elastic material by heating the resin tube at the other longitudinal end portion except for a circumferential part of the resin tube; a step of squeezing out an excessive adhesive from between the elastic material and the resin tube, in a direction from the longitudinal end portion to the other longitudinal end portion of the resin tube; and a step of fixing the resin tube onto the elastic material by heating the adhesive.

9 Claims, 13 Drawing Sheets

(51) Int. Cl.
  *B32B 38/04* (2006.01)
  *G03G 15/20* (2006.01)
  *B29C 65/48* (2006.01)
  *B29C 63/18* (2006.01)
  *B32B 37/12* (2006.01)

(52) U.S. Cl.
  CPC ........ *B29C 65/4835* (2013.01); *B29C 66/5221* (2013.01); *B29C 66/52272* (2013.01); *B32B 37/1207* (2013.01); *G03G 2215/2032* (2013.01); *Y10T 156/1052* (2015.01)

(56) References Cited

OTHER PUBLICATIONS

Miyahara et al., U.S. Appl. No. 14/064,328, Oct. 28, 2013.
Miyahara et al., U.S. Appl. No. 14/064,335, Oct. 28, 2013.
Akiyama et al., U.S. Appl. No. 14/063,229, Oct. 25, 2013.
Akiyama et al., U.S. Appl. No. 14/063,224, Oct. 25, 2013.
Miura et al., U.S. Appl. No. 14/158,098, Jan. 17, 2014.

* cited by examiner (a)

(b)

FIXING MEMBER MANUFACTURING METHOD AND FIXING MEMBER MANUFACTURING APPARATUS

FIELD OF THE INVENTION AND RELATED ART

The present invention relates to a fixing member manufacturing method and a fixing member manufacturing apparatus.

As a fixing member used in a fixing device to be conventionally mounted in an image forming apparatus of an electrophotographic type, a belt-shaped fixing member and a roller-shaped fixing member have been known.

As these fixing members, a fixing member prepared by forming an elastic layer (elastic material) of a heat-resistant rubber or the like on a substrate (base material) and then by providing, on a surface of the elastic layer, a resin layer (such as a fluorine-containing resin layer) having an excellent parting property with respect to a toner has been known.

As such a fixing member, Japanese Laid-Open Patent (JP-A) 2004-276290 discloses that a resin tube (e.g., a fluorine-containing resin tube) enlarged in diameter is externally fitted around a cylindrical elastic material and then the fluorine-containing resin tube is fixed by an adhesive with which an outer peripheral surface of the elastic material is coated. Specifically, the adhesive is cured by heating, so that the resin tube is fixed onto the elastic material.

In this heating step, the resin tube has a property of elongating in a longitudinal direction by heat, and therefore the resin tube may preferably be temporarily fixed in advance. Specifically, the resin tube may preferably be temporarily fixed locally onto the elastic material at longitudinal end portions thereof.

On the other hand, between the elastic material and the resin tube, an excessive adhesive is present (located), and therefore before the adhesive is cured by heating, the excessive adhesive is required to be squeezed from a longitudinal end portion to another (the other) longitudinal end portion of the resin tube.

However, in the step of squeezing the excessive adhesive, when the resin tube is temporarily fixed over full circumference at the other longitudinal end portion of the resin tube, the excessive adhesive cannot be removed from between the elastic material and the resin tube and thus stagnates (remains) between the elastic material and the resin tube. Thus, the portion where the adhesive stagnates is increased in thickness or is changed in thermal conductivity from another portion, and therefore there is a fear that the adhesive-stagnated portion causes improper fixing. For that reason, the temporarily fixed portion may preferably be cut away, but in that case, there is a fear that a net length of a resultant structure usable as the fixing member is shortened.

SUMMARY OF THE INVENTION

A principal object of the present invention is to provide a fixing member manufacturing method and a fixing member manufacturing apparatus which are capable of properly squeezing an excessive adhesive from between a resin tube and an elastic material.

According to an aspect of the present invention, there is provided a fixing member manufacturing method comprising: a first step of coating an outer peripheral surface of an elastic material with an adhesive; a second step of externally fitting a resin tube around the elastic material coated with the adhesive; a third step of temporarily fixing the resin tube onto the elastic material by heating the resin tube at a longitudinal end portion; a fourth step of temporarily fixing the resin tube onto the elastic material by heating the resin tube at another longitudinal end portion except for a circumferential part of the resin tube; a fifth step of squeezing out an excessive adhesive, located between the elastic material and the resin tube, from the longitudinal end portion to the another longitudinal end portion of the resin tube; and a sixth step of fixing the resin tube onto the elastic material by heating the adhesive located between the elastic material and the resin tube.

According to another aspect of the present invention, there is provided a fixing member manufacturing apparatus comprising: a coating device configured to coat an outer peripheral surface of an elastic material with an adhesive; a mechanism configured to externally fit a resin tube around the elastic material coated by the coating device with the adhesive; a mechanism configured to heat the resin tube at a longitudinal end portion to temporarily fix the resin tube onto the elastic material at the longitudinal end portion; a mechanism configured to heat the resin tube at another longitudinal end portion expect for a circumferential part of the resin tube to temporarily fix the resin tube onto the elastic material at the another longitudinal end portion; a mechanism configured to squeeze out an excessive adhesive, located between the elastic material and the resin tube, from the longitudinal end portion to the another longitudinal end portion of the resin tube; and a mechanism configured to heat the adhesive located between the elastic material and the resin tube to fix the resin tube onto the elastic material.

These and other objects, features and advantages of the present invention will become more apparent upon a consideration of the following description of the preferred embodiments of the present invention taken in conjunction with the accompanying drawings.

Figure 2:
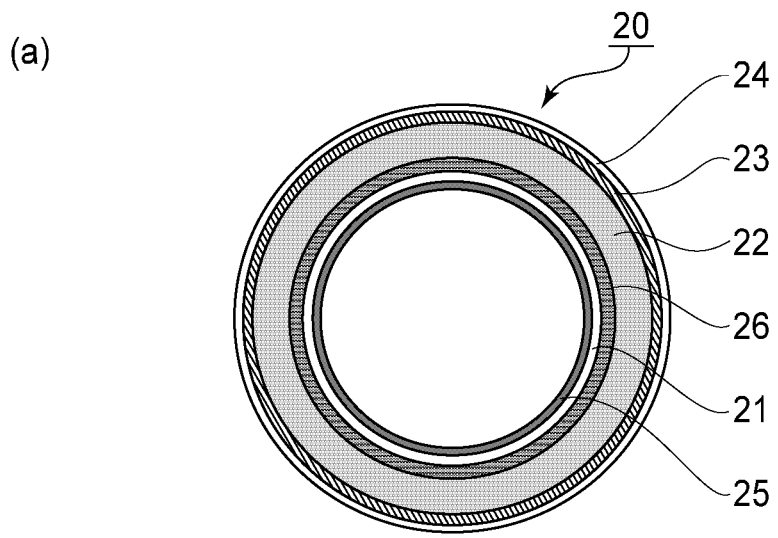
Figure 2:
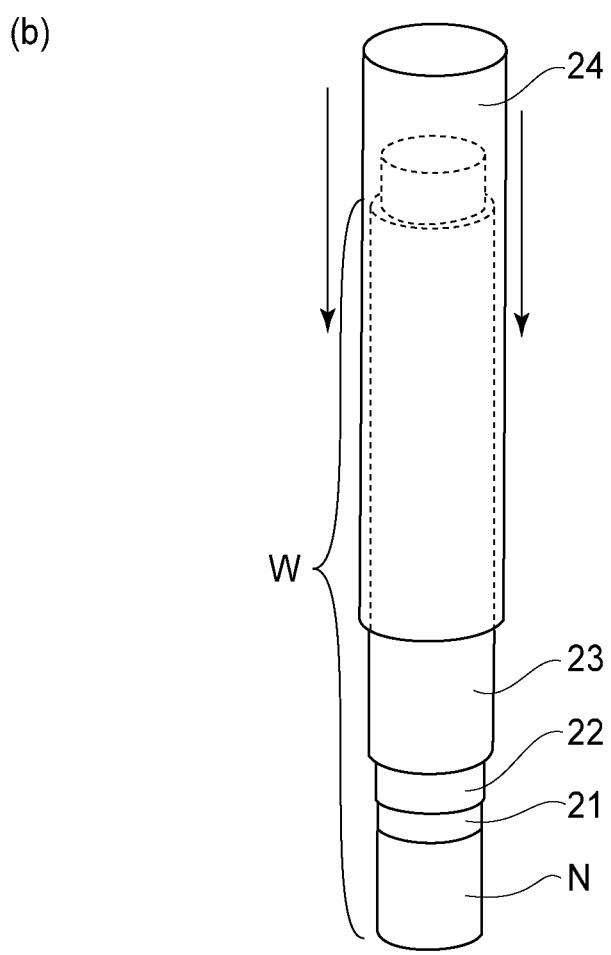

Parts (a) and (b) of FIG. 2 are schematic views for illustrating a layer structure of a fixing belt (or a pressing belt).

Figure 3:
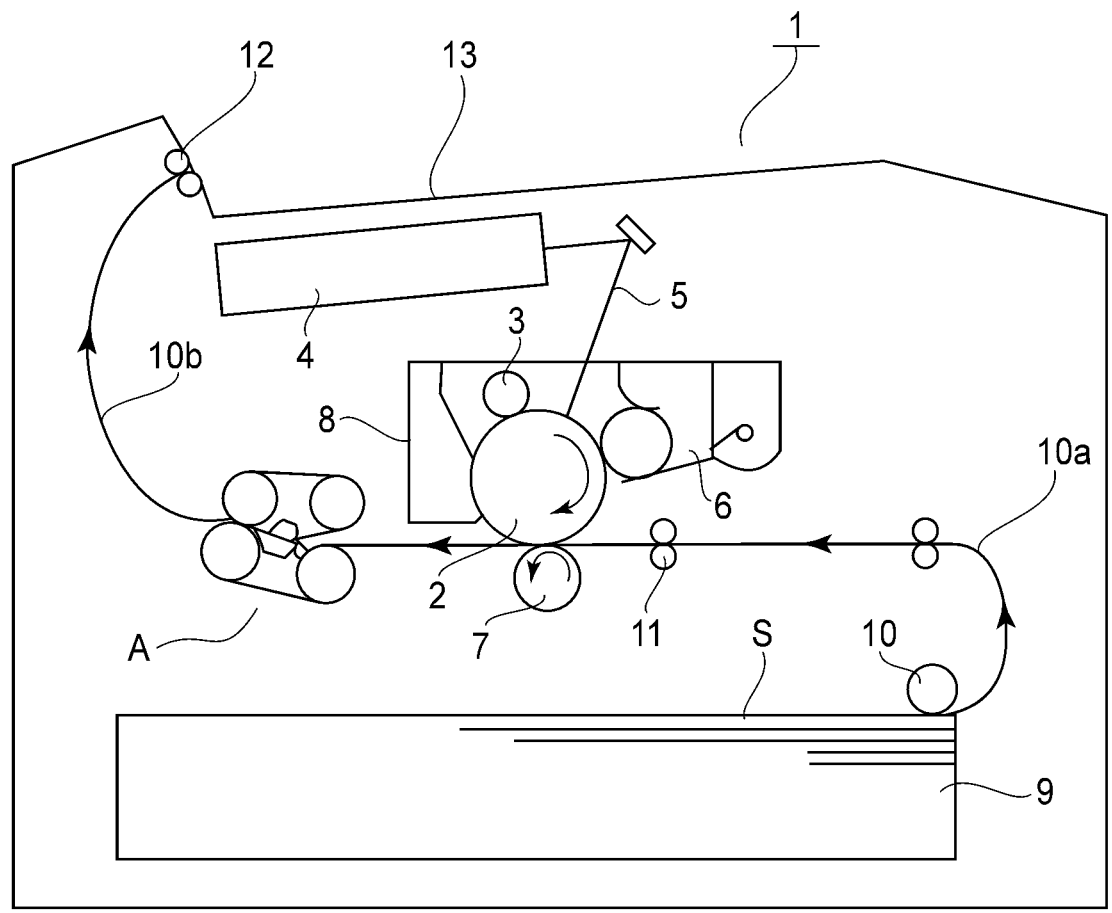

FIG. 3 is a schematic view for illustrating a structure of an image forming apparatus as an example.

Figure 4:
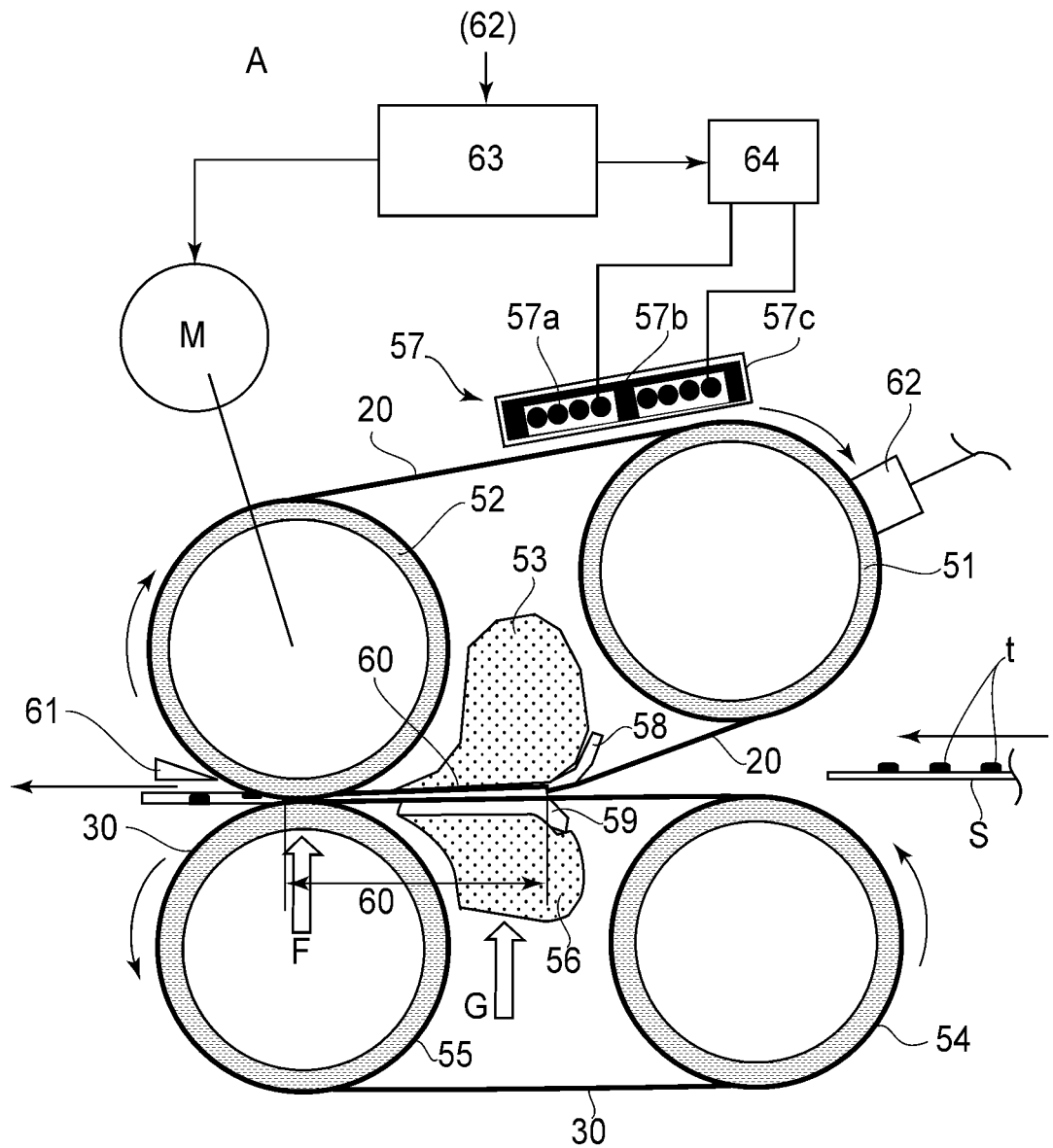

FIG. 4 is a schematic view for illustrating a fixing device in Embodiment 1.

Figure 5:
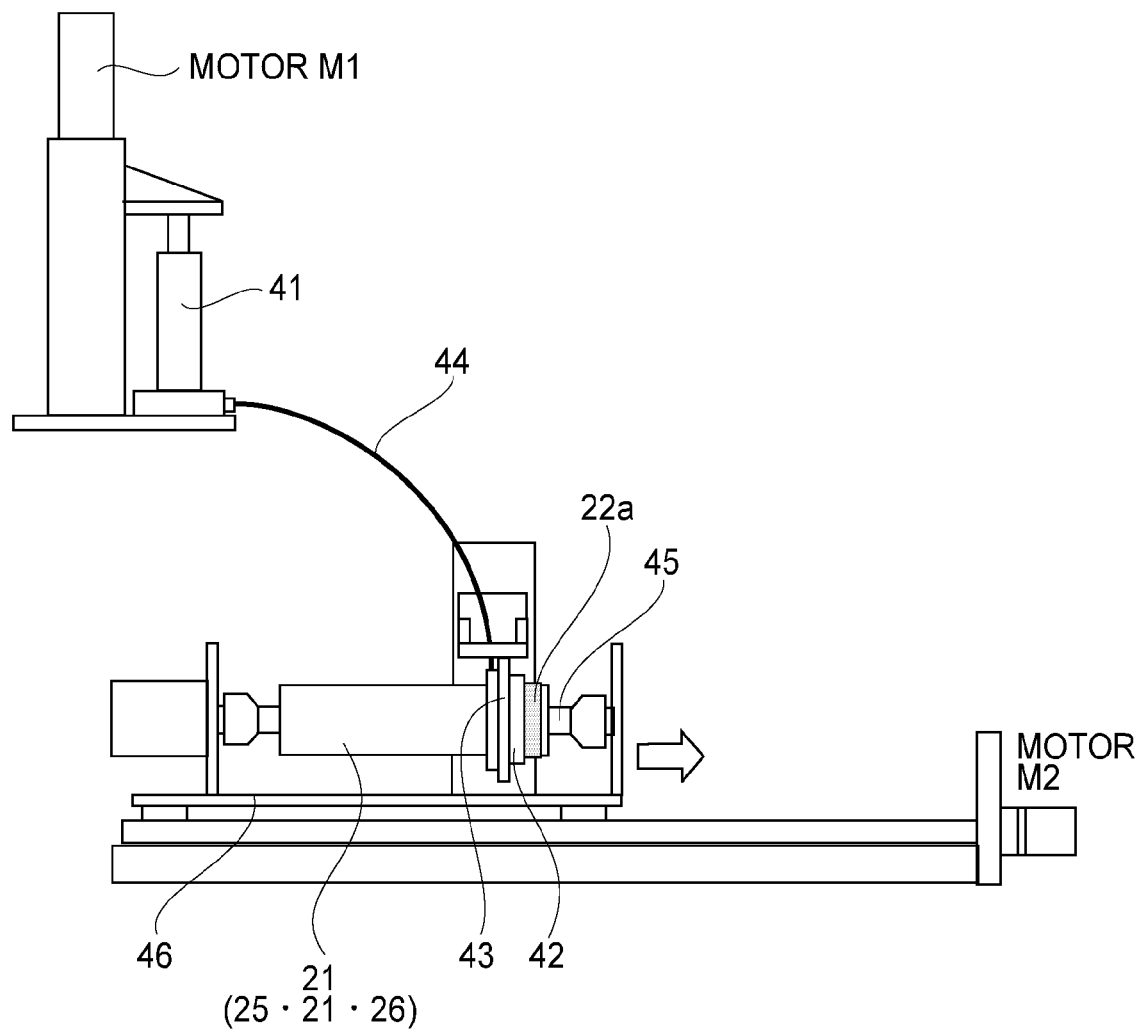

FIG. 5 is a schematic view for illustrating an elastic layer forming method.

Figure 6:
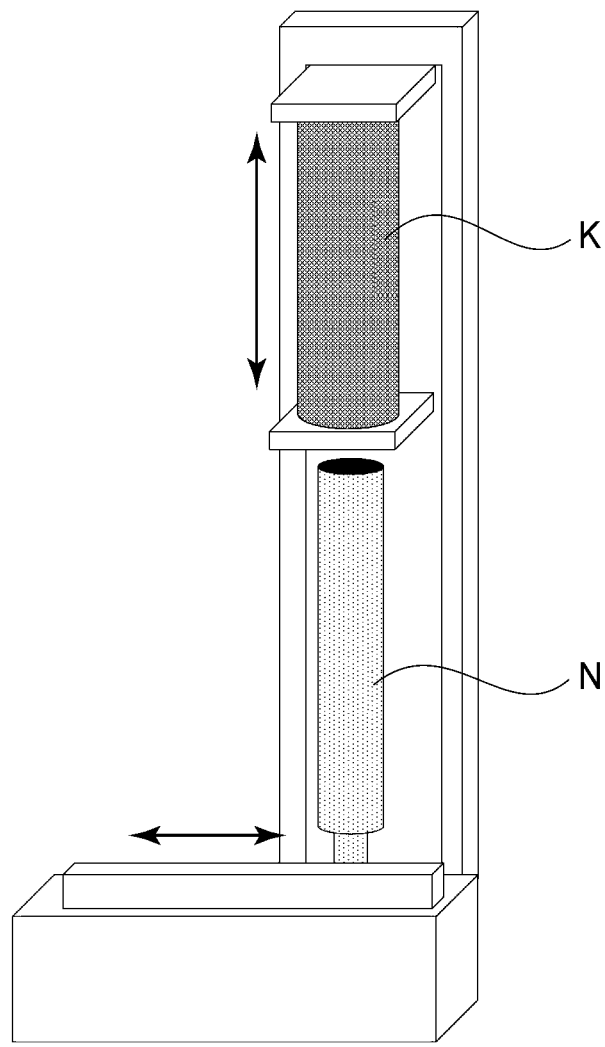

FIG. 6 is a schematic view showing an outer appearance of a PFA tube coating.

Figure 7:
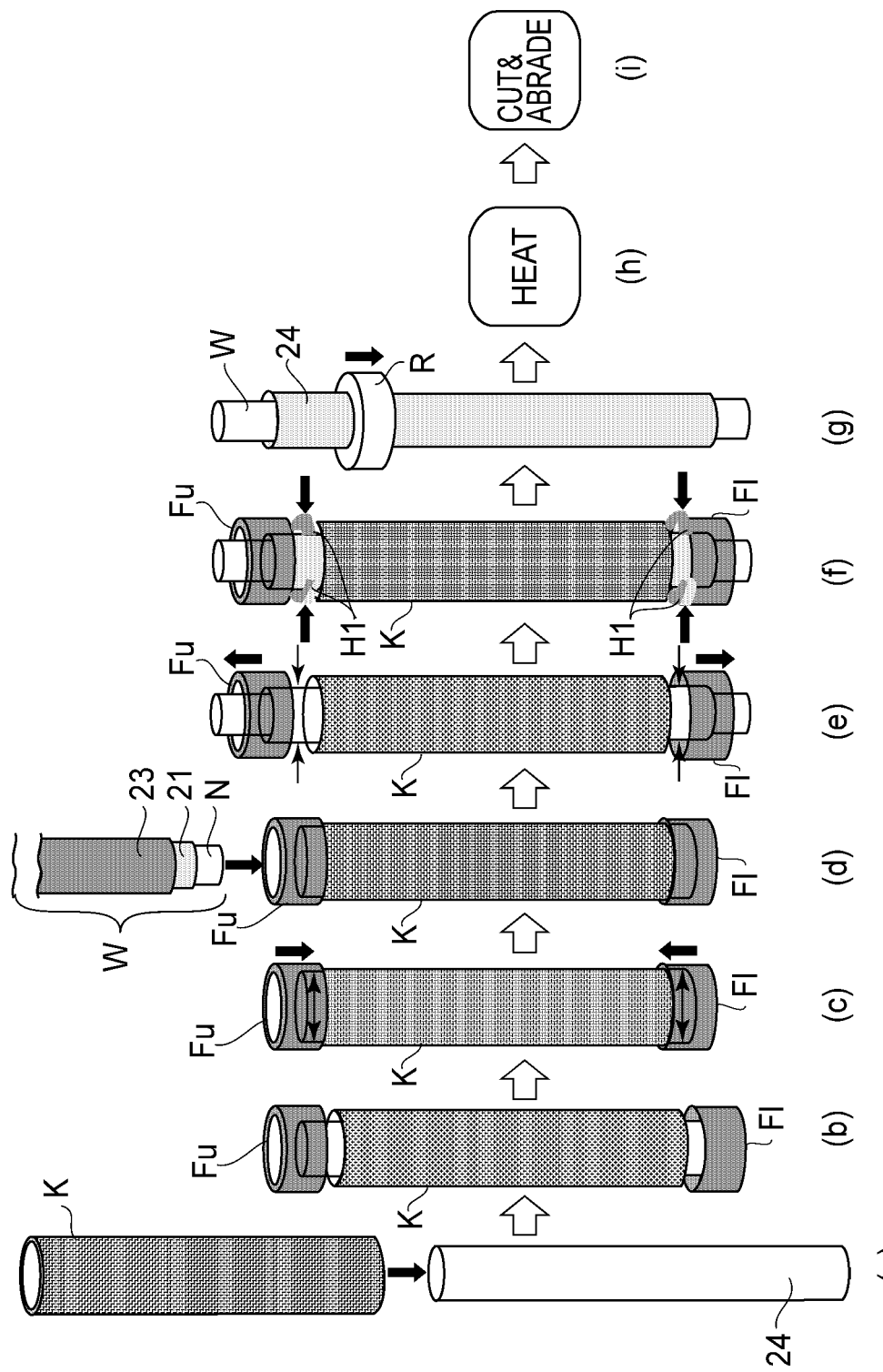

Parts (a) to (i) of FIG. 7 are schematic views for illustrating a PFA tube coating method in Embodiment 1.

Figure 8:
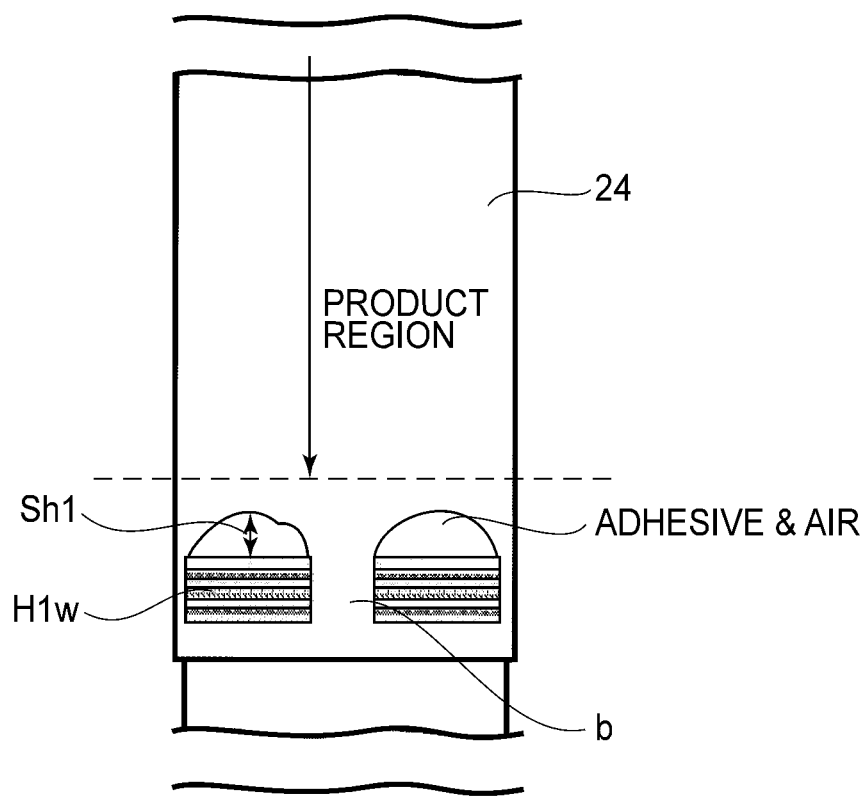

FIG. 8 is a schematic view for illustrating a lower end portion of a PFA tube after a squeezing step in Embodiment 1.

Figure 9:
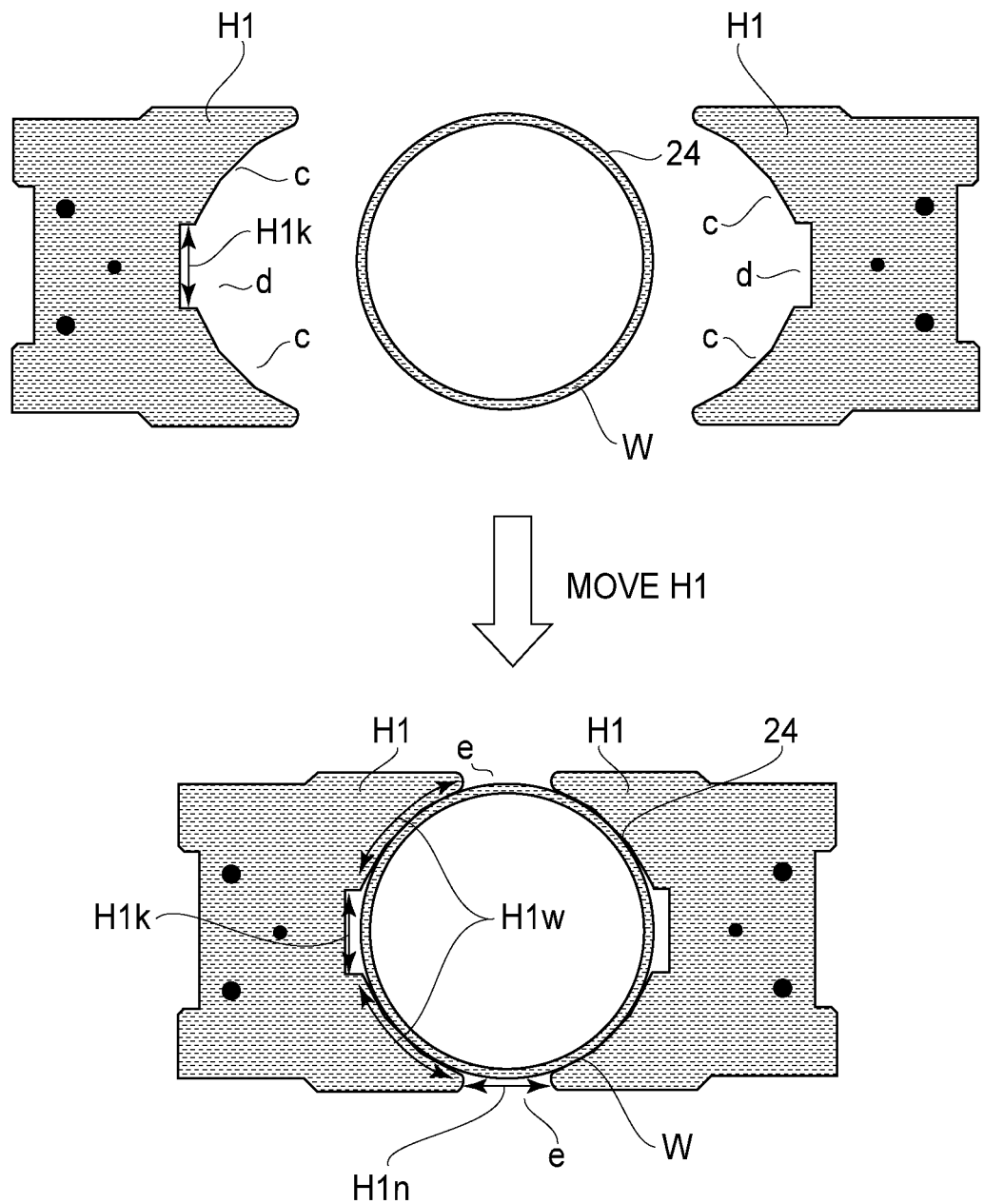

FIG. 9 is a schematic view for illustrating a caulking bit in Embodiment 1.

Figure 10:
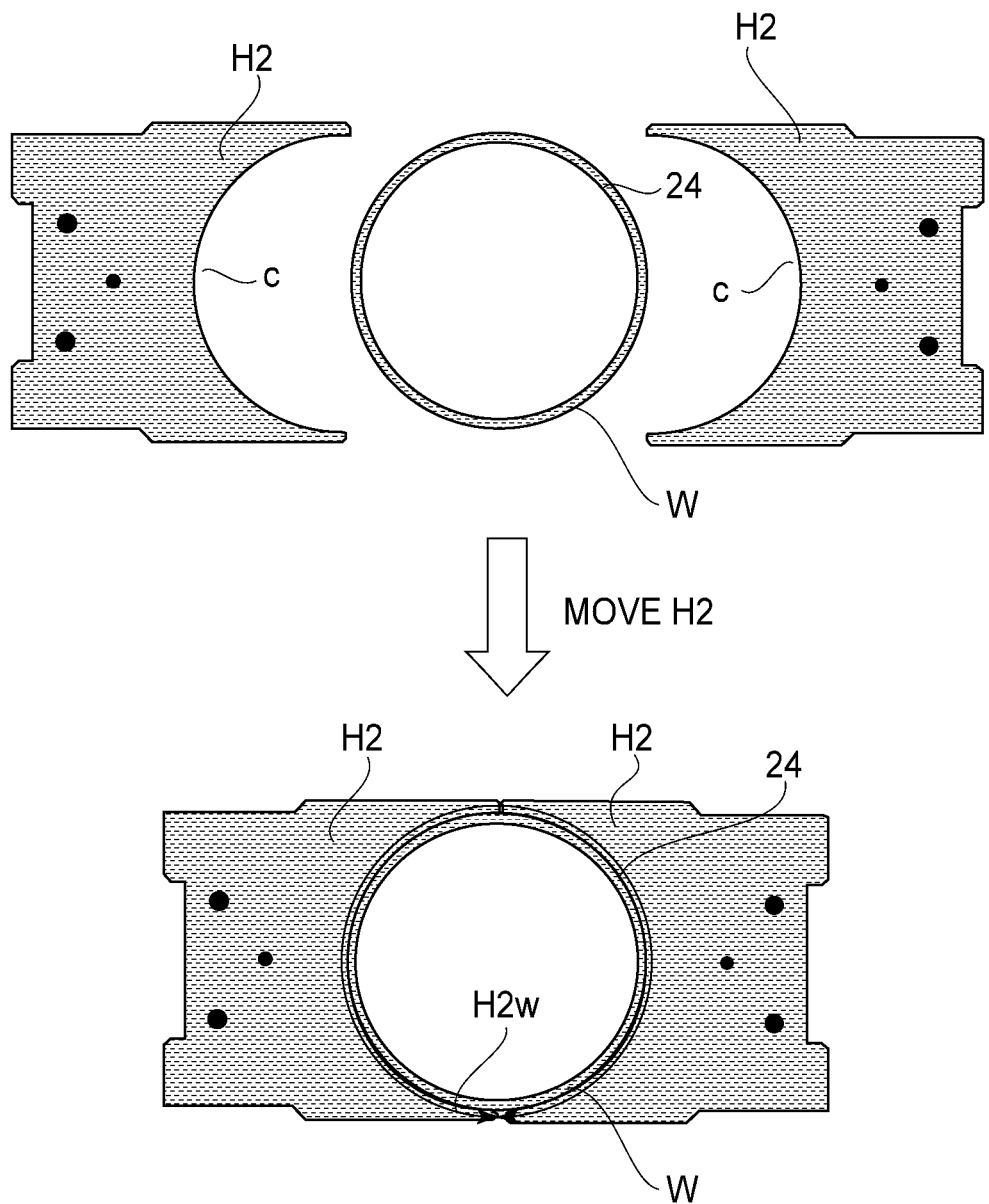

FIG. 10 is a schematic view for illustrating a caulking bit in Comparison example 1.

Figure 11:
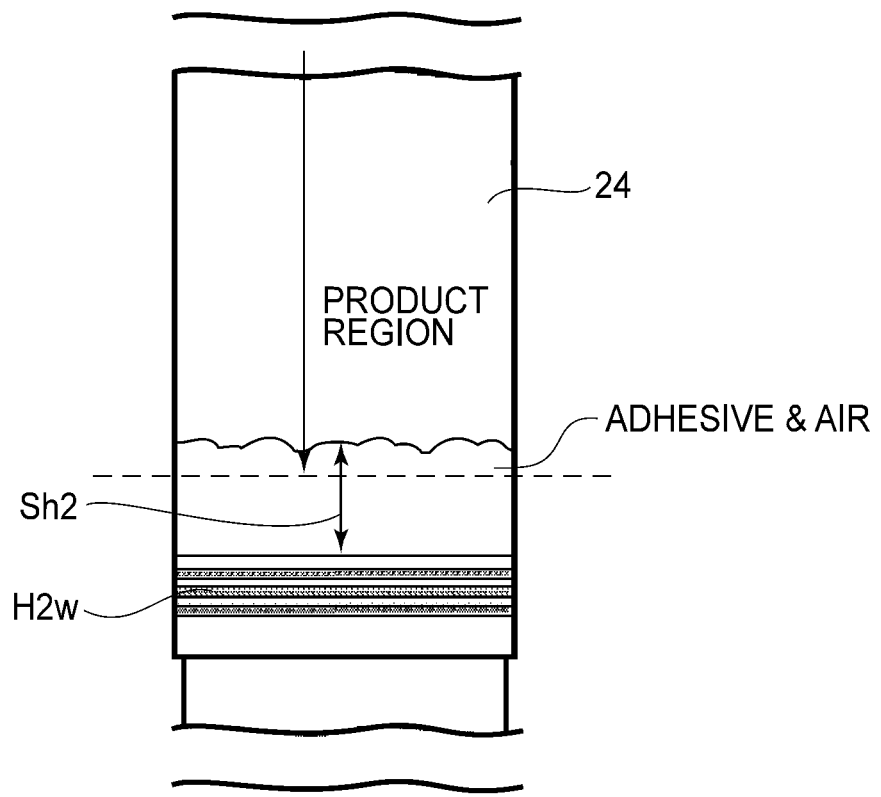

FIG. 11 is a schematic view for illustrating a lower end portion of a PFA tube after a squeezing step in Comparison example 1.

Figure 12:
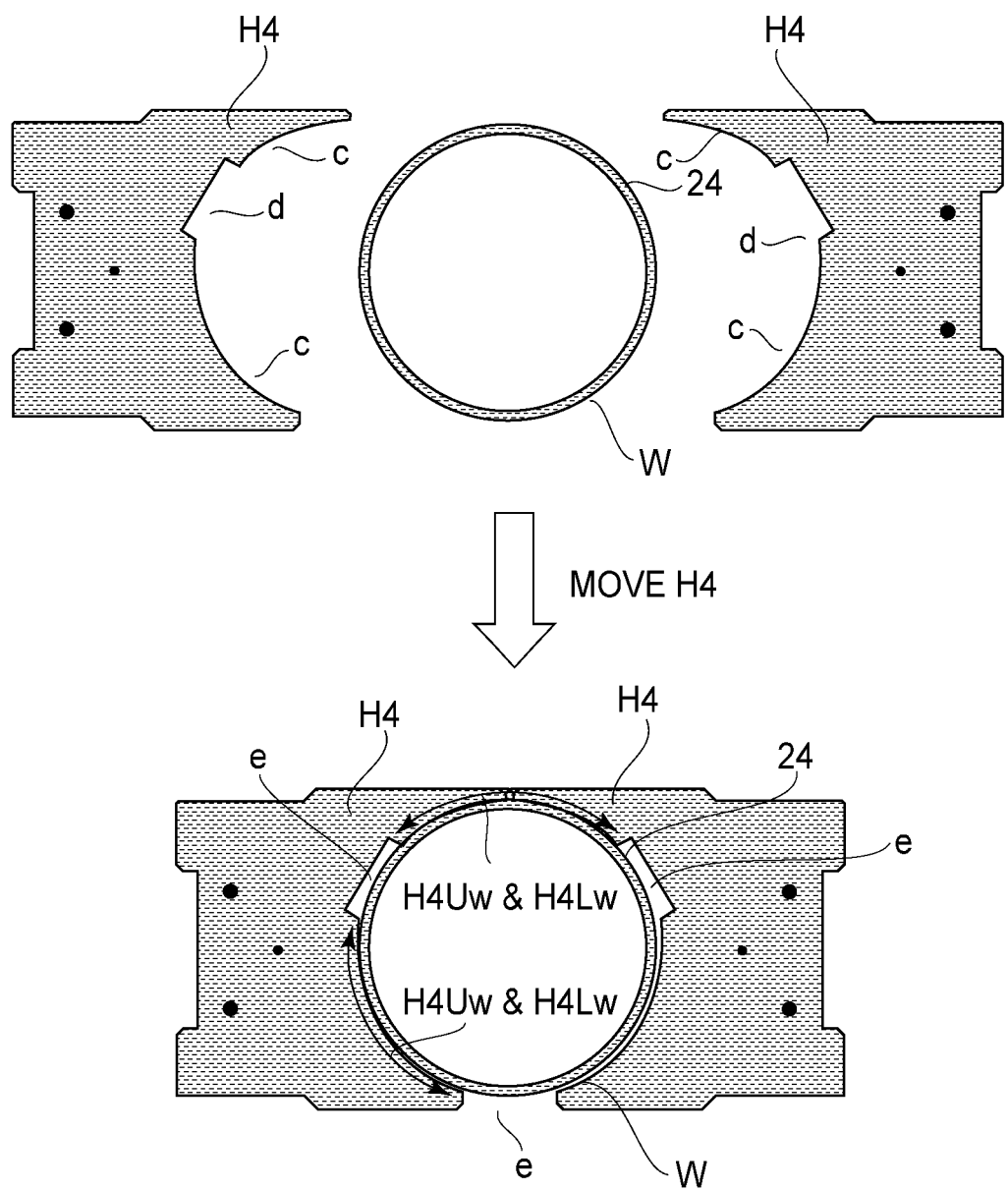

FIG. 12 is a schematic view for illustrating a caulking bit in Embodiment 2.

Figure 13:
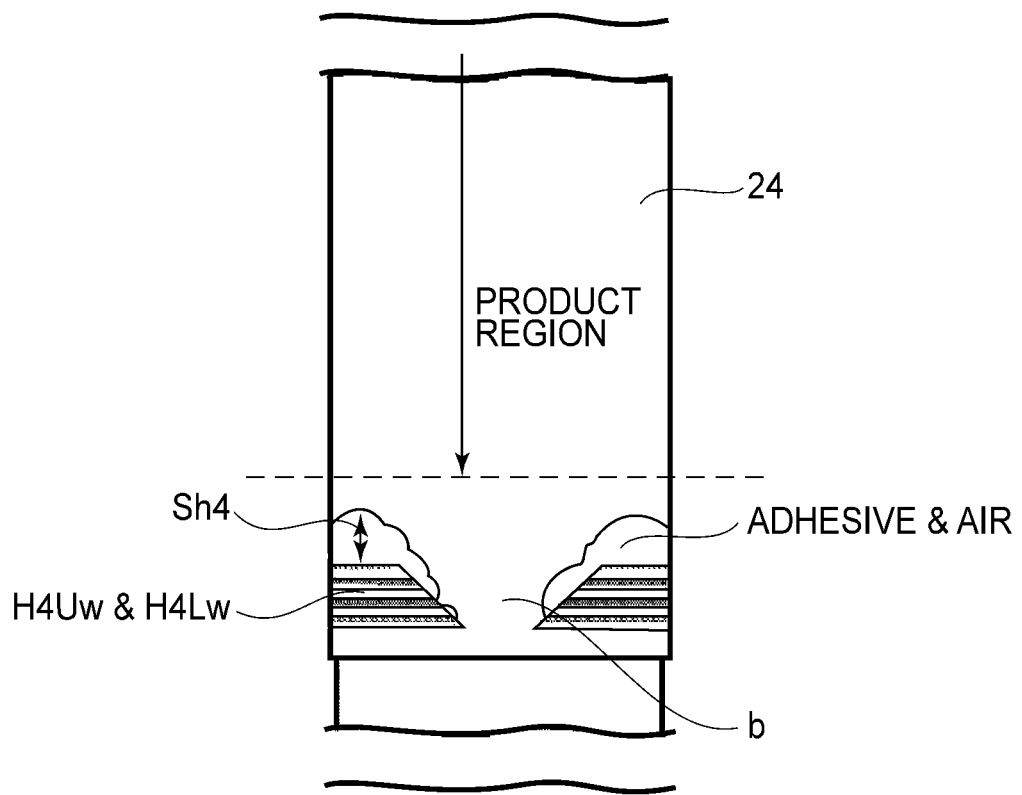

FIG. 13 is a schematic view for illustrating a lower end portion of a PFA tube after a squeezing step in Embodiment 2.

DESCRIPTION OF THE PREFERRED EMBODIMENTS

The present invention will be described specifically based on embodiments. Incidentally, although these embodiments are examples of embodiments to which the present invention, but the present invention is not limited thereto, and various modifications can be made within a range of the concept of the present invention.

Embodiment 1

(1) Image Forming Apparatus

FIG. 3 is a schematic illustration showing a general structure of an image forming apparatus used in this embodiment. An image forming apparatus 1 is a laser printer of an electrophotographic type and includes a photosensitive drum 2 as an image bearing member for bearing a latent image. The photosensitive drum 2 is rotationally driven in the clockwise direction at a predetermined peripheral speed, so that an outer surface of the photosensitive drum 2 is electrically charged uniformly to a predetermined polarity and a predetermined potential. The uniformed charged surface of the photosensitive drum 2 is exposed to laser light 5 based on image information by a laser scanner (optical device) 4. As a result, on the surface of the photosensitive drum 2, an electrostatic latent image corresponding to the image information of the laser light is formed.

The electrostatic latent image is developed as a toner image by a developing device 6. The toner image is successively transferred onto a recording material (sheet) S, introduced into a transfer portion as a contact portion between the photosensitive drum 2 and a transfer roller 7, at the transfer portion.

Sheets of the recording material S are stacked and accommodated in a sheet feeding cassette 9 provided at a lower portion of the image forming apparatus. At predetermined sheet feeding timing, when a sheet feeding roller 10 is driven, the sheets of the recording material S in the sheet feeding cassette 9 are separated and fed one by one, and then the separated and fed recording material S passes through a conveying passage 10a to reach a registration roller pair 11. The registration roller pair 11 receives a leading edge portion of the recording material S to rectify oblique movement of the recording material S. The recording material S is sent to the transfer portion in synchronism with the toner image on the photosensitive drum 2 so that timing when a leading end portion of the toner image on the photosensitive drum 2 reaches the transfer portion coincides with timing when also the leading edge portion of the recording material S just reaches the transfer portion.

The recording material S passing through the transfer portion is separated from the surface of the photosensitive drum 2, and then is conveyed into an image fixing device A. By the fixing device A, the unfixed toner image on the recording material S is fixed as a fixed image on the recording material surface under application of heat and pressure. Then, the recording material S passes through a conveying passage 10b and then is discharged and placed on a discharge tray 13, by a discharging roller pair 12, provided at an upper portion of the image forming apparatus. Further, the surface of the photosensitive drum 2 after the recording material separation is cleaned by removing a residual deposited matter such as a transfer residual toner by a cleaning device 9, thus being repetitively subjected to image formation.

(2) Fixing Device A

FIG. 4 is a schematic illustration showing a general structure of the fixing device A. The fixing device A is of a twin belt type and of an electromagnetic induction heating type.

Here, with respect to the fixing device A and members constituting the fixing device A, a longitudinal direction refers to a direction parallel to a direction perpendicular to a recording material conveyance direction in a plane of a recording material conveying passage. With respect to the fixing device, a front (side or surface) refers to a side or surface in a recording material introducing side. Left and right refer to left and right as seen from the front side of the fixing device. A width of the belt refers to a dimension of the belt with respect to the direction perpendicular to the recording material conveyance direction, i.e., the dimension of the belt with respect to the longitudinal direction. A width of the recording material refers to a dimension of the recording material with respect to the direction perpendicular to the recording material conveyance direction in a plane of the recording material. Further, upstream and downstream refer to upstream and downstream with respect to the recording material conveyance direction.

The fixing device A includes a fixing belt (heating member) 20 and a pressing belt (pressing member) 30 between which a nip where the recording material is heated and pressed which being nipped and conveyed is to be formed. Both of the fixing belt 20 and the pressing belt 30 are a flexible endless belt.

A structure of the fixing belt 20 will be specifically described later in (3). The fixing belt 20 is extended and stretched around a tension roller 51 and a fixing roller 52 which are provided, as a belt stretching member, in parallel to each other with a spacing, and a downward fixing pad 53 which is provided, as a first photosensitive drum, between the rollers 51 and 52. Each of the tension roller 51 and the fixing roller 52 is shaft-supported rotatably between left and right side plates of a fixing device casing (not shown). The fixing pad 53 is supported and disposed between the left and right side plates of the fixing device casing.

The tension roller 51 is an iron-made hollow roller of 20 mm in outer diameter, 18 mm in inner diameter and 1 mm in thickness, and provides tension to the fixing belt 20.

The fixing roller 52 is an elastic roller, having a high sliding property, which is prepared by forming a silicone rubber elastic layer, as an elastic layer, on an iron alloy-made hollow core metal of 20 mm in outer diameter, 18 mm in inner diameter and 1 mm in thickness. The fixing roller 52 is used as a driving roller into which a driving force is inputted from a driving source (motor) M via an unshown driving gear train, thus being rotationally driven in the clockwise direction of an arrow at a predetermined speed.

By providing the fixing roller 52 with the elastic layer as described above, it is possible to satisfactorily transmit the driving force, inputted into the fixing roller 52, to the fixing belt 20, and at the same time, it is possible to form a fixing nip for ensuring a separating property of the recording material S from the fixing belt 20. Hardness of the silicone rubber is 15 degrees in terms of JIS-A hardness. The silicone rubber elastic layer is also effective in shortening a warming-up time since an amount of heat conduction to the inside is also decreased.

The pressing belt 30 is prepared, in this embodiment, by providing, on a base layer of electroformed nickel, a 30 μm-thick tube of PFA, which is a fluorine-containing resin material, as a surface parting layer. In FIG. 4, the pressing belt 30 is located below the fixing belt 20 and is disposed in the following manner. That is, the pressing belt 30 is extended and stretched around a tension roller 54 and a pressing roller 55 which are provided, as a belt stretching member, in parallel to each other with a spacing, and a upward fixing belt 56 which is provided, as a second photosensitive drum, between the rollers 54 and 55. Each of the tension roller 54 and the pressing roller 55 is shaft-supported rotatably between left and right side plates of a fixing device casing (not shown).

The tension roller 54 is prepared by forming a silicone sponge layer for decreasing a degree of heat conduction from the pressing belt 30 by decreasing heat conductivity, on an iron alloy-made hollow core metal of 20 mm in outer diameter, 16 mm in inner diameter and 2 mm in thickness. The tension roller 54 provides tension to the pressing belt 30. The pressing roller 55 is an iron alloy-made hollow rigid roller, having a low sliding property, of 20 mm in outer diameter, 16 mm in inner diameter and 2 mm in thickness. The pressing pad 56 is supported and disposed between the left and right side plates of the fixing device casing.

Further, in order to form a fixing nip 60 as an image heating portion between the fixing belt 20 and the pressing belt 30, the pressing roller 55 is pressed at each of left and right end portions of a rotation shaft thereof by a pressing mechanism (not shown) toward the fixing roller 52 in an arrow F direction at a predetermined pressure.

Further, in order to obtain a wide fixing nip 60 without upsizing the fixing device, the pressing pad 56 is employed. That is, the fixing belt 20 is pressed toward the pressing belt 30 by the fixing pad 53, and at the same time, the pressing belt 30 is pressed toward the fixing belt 20 by the pressing pad 56. The pressing pad 56 is pressed toward the fixing pad 53 in an arrow G direction at predetermined pressure by a pressing mechanism (not shown). The fixing belt 20 and the pressing belt 30 are press-contacted to each other between the fixing pad 53 and the pressing pad 56, so that the wide fixing nip 60 is formed with respect to the recording material conveyance direction.

The fixing pad 53 includes a pad substrate and a slidable sheet (low-friction sheet) 58 contacted to the fixing belt inner surface. The pressing pad 56 includes a pad substrate and a slidable sheet 59 contacted to the pressing belt inner surface. This is because in the case where the belt base layer is formed of metal, there is a problem that an amount of abrasion (wearing) of a portion of the pad sliding on the inner peripheral surface of the belt is large. By interposing each of the slidable sheets 58 and 59 between the belt and the pad substrate, the abrasion of the pad can be prevented and it is also possible to reduce sliding resistance, and therefore it is possible to ensure a good belt travelling property and a good belt durability.

As a heating means for the fixing belt 20, a heating source (induction heating member, exciting coil) of an electromagnetic induction heating type having high energy efficiency is employed. An induction heating member 57 as the heating source is provided, with a slight gap, opposed to an outer surface of an upper-side belt portion of the fixing belt 20.

The induction heating member 57 is constituted by an induction coil 57a, an exciting core 57b and a coil holder 57c for holding the coil and the core. The induction coil 57a is wound in an elongated circular and flat shape by using Litz wire and is provided in the exciting core 57b formed in a downward E shape projected to a central portion and end portions of the induction coil 57a. The exciting core is formed by using a material, having high magnetic permeability and low residual magnetic flux density, such as ferrite or permalloy, and therefore loss of the induction coil 57a and the exciting core 57b can be suppressed, so that it is possible to efficiently heat the fixing belt 20.

A fixing operation is as follows. A control circuit portion 63 drives a motor M at least during execution of image formation. Further, a high-frequency current is carried from an exciting circuit 64 through the induction coil 57a of the induction heating member 57.

By driving the motor M, the fixing roller 52 is rotationally driven. As a result, the fixing belt 20 is rotationally driven in the same direction as the fixing roller 52. A peripheral speed of the fixing belt 20 is slightly slower than a conveyance speed of the recording material (sheet) S conveyed from the image forming portion in order to form a loop on the recording material S in a recording material entrance side of the fixing nip 60. In this embodiment, the peripheral speed of the fixing belt 20 is 300 mm/sec, so that a full-color image can be formed on an A4-sized sheet at a rate of 70 sheets/min.

The pressing belt 30 is rotated by the rotation of the fixing belt 20 by a frictional force with the fixing belt 20 at the fixing nip 60. Here, by employing a constitution in which a downstreammost portion of the fixing nip 60 is conveyed by sandwiching the fixing belt 20 and the pressing belt 30 between the roller pair 52 and 55, slip of the belt can be prevented. The downstreammost portion of the fixing nip 60 is a portion where a pressure distribution (with respect to the recording material conveyance direction) at the fixing nip 60 is maximum.

On the other hand, by passing the high-frequency current from the exciting circuit 54 through the induction coil 57a of the induction heating member 57, the metal layer of the fixing belt 20 generates heat by induction heating, so that the fixing belt 20 is heated. A surface temperature of the fixing belt 20 is detected by a temperature detecting element 62 such as a thermistor. A signal relating to the temperature of the fixing belt 20 detected by the temperature detecting element 62 is inputted into the control circuit portion 63. The control circuit portion 63 controls electric power supplied from the exciting circuit 64 to the induction coil 57a so that temperature information inputted from the temperature detecting element 62 is maintained at a predetermined fixing temperature, thus controlling the temperature of the belt 20 at the predetermined fixing temperature.

In a state in which the fixing belt 20 is rotationally driven and is increased up to the predetermined fixing temperature to be temperature-controlled, into the fixing nip 60 between the fixing belt 20 and the pressing belt 30, the recording material S on which the unfixed toner image t is carried is conveyed. The recording material S is introduced with the surface, toward the fixing belt 20, where the unfixed toner image t is carried. Then, the recording material S is nipped and conveyed through the fixing nip 60 while intimately contacting the outer peripheral surface of the fixing belt 20 at the unfixed toner image carrying surface thereof, so that the recording material S is supplied with heat and pressure from the fixing belt 20, and thus the unfixed toner image t is fixed on the surface of the recording material S.

Further, the fixing roller 32 in the fixing belt 20 in the elastic roller having the rubber layer, and the pressing roller 55 in the pressing belt 30 is the iron alloy-made rigid roller, and therefore a degree of deformation of the fixing roller 52 is large at an exit of the fixing nip 60 between the fixing belt 20 and the pressing belt 30. As a result, also the fixing belt 20 is larger deformed, so that the recording material S on which the fixed toner image is carried is curvature-separated from the fixing belt 20 by its own resilience. At the fixing nip exit, a separation assisting claw member 61 is provided.

(3) Fixing Belt 20

Part (a) of FIG. 2 is schematic sectional view showing a layer structure of the fixing belt 20 as the fixing member in this embodiment, and (b) of FIG. 2 is a schematic view for illustrating a manner of lamination of constituent layers. The fixing belt 20 includes a base material (cylindrical substrate) 21, an inner surface slidable layer 25 provided on an inner peripheral surface of the base material 21, a primer layer (adhesive layer) 26 with which an outer peripheral surface of the base material 21 is coated, an elastic (cylindrical elastic material) 22 provided on the primer layer 26, and a resin tube, e.g., a fluorine-containing resin tube in this embodiment, as a surface layer (toner parting layer 24). The resin tube 24 is fixed by an adhesive layer 23 onto the peripheral surface of the elastic layer 22.

The fixing belt 20 in this embodiment is a laminated composite layer member having the above-mentioned 6 layers, and is a thin fixing member having flexibility as a whole and low thermal capacity. Further, the fixing belt 20 holds a substantially cylindrical shape in a free state thereof. The respective constituent layers will be specifically described below.

(3-1) Base Material 21

In this embodiment, in order to heat the base material 21 by the above-described induction heating member 57, the base material 21 for the fixing belt 20 is formed in a metal layer of SUS alloy, nickel, iron, magnetic stainless steel, cobalt-nickel alloy, or the like. In this embodiment, an electroformed nickel belt of 55 mm in inner diameter and 65 μm in thickness is used as the base material 21.

The thickness of the base material 21 may preferably be 1-300 μm. When the thickness of the base material 21 is smaller than 1 μm, rigidity is low, and therefore it becomes difficult to withstand a durability test of a large number of sheets. Further, when the thickness of the base material 21 exceeds 300 μm, the rigidity becomes excessively high, and flexing resistance is lowered, so that use of the resultant belt as the rotatable belt member is not practical. The thickness of the base material 21 may preferably be 20 μm to 100 μm.

(3-2) Inner Surface Slidable Layer 25

As a material for the inner surface slidable layer 25, a resin material, such as polyimide resin, having high durability and high heat resistance is suitable. In this embodiment, a polyimide precursor solution obtained by reaction, in an organic polar solvent, of aromatic tetracarboxylic dianhydride or its derivative with aromatic diamine in a substantially equimolecular amount was applied onto the inner surface of the base material 21. Thereafter, the solution was dried and heated to form a polyimide resin layer by dewatering cyclization reaction, thus preparing the inner surface slidable layer 25.

(3-3) Elastic Layer 22

Over the outer peripheral surface of the base material 21, the elastic layer 22 is provided via the primer layer 26. As a material for the elastic layer 22, a known elastic material can be used. For example, silicone rubber, fluorine-containing rubber and the like can be used.

The thickness of the elastic layer 22 may preferably be 100 μm or more in order to prevent uneven glossiness caused due to unevenness of the recording material S or failure that the heating surface of the fixing belt cannot follow the unevenness in the case where an image is printed.

When the thickness of the elastic layer 22 is less than 100 μm, a function of the elastic layer 22 as an elastic member cannot be readily achieved, and therefore a pressure distribution during fixing becomes non-uniform, so that particularly during full-color image fixing, an unfixed toner (image) of a secondary color cannot be sufficiently heat-fixed to cause non-uniformity of gloss on a fixed image. Further, due to insufficient melting, a color-mixing property of the toner is lowered, so that a high-definition full-color image cannot be obtained, thus being unpreferable. In this embodiment, silicone rubber is used as the material for the elastic layer 22, and the elastic layer 22 is 6 degrees in JIS-A hardness, 0.8 W/mk in thermal conductivity and 450 μm in thickness.

A coating method of the elastic layer 22 will be described with reference to FIG. 5.

FIG. 5 shows an example of a coating step of forming the silicone rubber layer as the elastic layer 22 by a coating device and is a schematic view for illustrating a method using a so-called ring-coating (method).

In this embodiment, in the coating device, the addition curing type silicone rubber composition in which the addition curing type silicone rubber and the filler are mixed is charged into a cylinder pump 41. Then, the composition is pressured-fed from the cylindrical pump 41 to a ring-shaped coating head 42, so that the addition curing type silicone rubber composition is applied onto the peripheral surface of the cylindrical substrate 21 (25, 21, 26) from a coating liquid supply nozzle (not shown) provided inside the ring-shaped coating head 42. The peripheral surface of the cylindrical substrate 21 has been subjected to primer treatment in advance by a known method.

In the coating device, coating head 42 is held by a fixed coating head holding portion 43. Then, the cylinder pump 41 is driven by a motor M1 to press-feed the addition curing type silicone rubber composition to the coating head 43 via a tube 44.

The cylindrical substrate 21 (exactly the structure consisting of the layers 25, 21, 26, 22, 23 and 24) is externally fitted and held around a cylindrical core metal held by a core metal holding tool (fixture) 45. The core metal holding tool 45 is held by a coating table 46 so that an axis thereof is horizontal, and thus is horizontally movable. The ring-shaped coating head 42 is coaxially and externally fitted around the cylindrical substrate 20b. The coating table 46 is reciprocated in a horizontal axis direction of the core metal holding tool 45 at a predetermined speed by a motor M2.

Simultaneously with the coating by the coating head 42, by moving (reciprocating) the cylindrical substrate 21 in a right direction in FIG. 5, a coated film (layer) 22a of the addition curing type silicone rubber composition can be cylindrically formed on the peripheral surface of the cylindrical substrate 21.

A thickness of the coated film 22a can be controlled by a clearance between the coating liquid supply nozzle and the cylindrical substrate 21, a supplying (feeding) speed of the silicone rubber composition, a moving speed of the cylindrical substrate 21, and the like.

The addition curing type silicone rubber composition layer 22b formed on primer layer 26 (formed on the cylindrical substrate 21) is heated for a certain time by a heating means such as electric furnace to cause crosslinking reaction, so that the silicone rubber elastic layer 22 can be formed. In this embodiment, the silicone rubber composition layer 22a was heated at 200° C. for 30 minutes in the electric furnace.

(3-4) Adhesive Layer 23

The adhesive layer 23 for fixing the fluorine-containing resin tube as the surface layer 24 over the cured silicone rubber layer as the elastic layer 22 is uniformly applied in a thickness of 1-10 μm onto the surface of the elastic layer 20d (an adhesive coating step in which the outer peripheral surface of the cylindrical elastic layer is coated with the adhesive). In this embodiment, the adhesive 23 is constituted by a cured material of an addition curing type silicone rubber adhesive. The addition curing type silicone rubber adhesive 23 contains an addition curing type silicone rubber in which a self-adhesive component is mixed.

Specifically, the addition curing type silicone rubber adhesive 23 contains organopolysiloxane having unsaturated hydrocarbon group represented by vinyl group, hydrogen organopolysiloxane, and a platinum compound as a crosslinking catalyst. The adhesive 20e is cured (hardened) by addition reaction. As such an adhesive 20e, a known adhesive can be used. In this embodiment, the addition layer was uniformly applied in a thickness of about 5 μm.

(3-5) Fluorine-Containing Resin Tube 24

As the surface layer (toner parting layer) of the fixing member, from the viewpoints of a molding property and a toner parting property, a fluorine-containing resin tube 24 formed by extrusion molding is used.

As the fluorine-containing resin material, a tetrafluoroethylene/perfluoroalkylvinyl ether copolymer (PFA) excellent in heat resistance is suitably used (PFA tube).

The PFA tube used is formed by the extrusion molding. A type of copolymerization of a starting material for PFA is not limited particularly but may include, e.g., random copolymerization, block copolymerization, graft copolymerization, and the like.

Further, a content molar ratio between tetrafluoroethylene (TFE) and perfluoroalkylvinyl ether (PAVE) which are the starting material for PFA is not limited particularly. For example, the content molar ratio of TFE/PAVE may suitably be 94/6 to 99/1.

As other fluorine-containing resin materials, it is possible to use tetrafluoroethylene/hexafluoropropylene copolymer (FEP), polytetrafluoroethylene (PTFE), ethylene/tetrafluoroethylene copolymer (ETFE), polychlorotrifluoroethylene (PCTFE), ethylene/chlorotrifluoroethylene copolymer (ECTFE), polyvinylidene fluoride (PVDF), and the like. These fluorine-containing resin materials can be used singly or in combination of two or more species.

In this embodiment, the PFA tube obtained by the extrusion molding was used. A thickness of the rube was 50 μm. An inner diameter of the tube was somewhat smaller than an outer diameter of the elastic layer 22, and was 52 mm. An inner surface of the rube has been subjected to the ammonia treatment in order to improve the adhesive property.

(3-6) Fluorine-Containing Resin Tube Coating Step

In this embodiment, a method in which the PFA tube 24 as the surface layer is expanded and the adhesive layers 23 is coated with the PFA tube 24 (expansion coating method in a step in which the cylindrical elastic layer 22 coated with the adhesive 23 is coated with the fluorine-containing resin tube 24) was used. FIG. 6 is a schematic view showing an outer appearance of a device (apparatus) for coating the base material 21, on which the silicone rubber layer 22 is laminated, with the PFA tube 24 by the expansion coating method. In this device, on a core N ((b) of FIG. 2), a base material W (25, 21, 26, 22, 23) is set, and then the base material W is coated with the PFA tube 24 disposed at an inner surface of a tube expansion mold K in accordance with the expansion coating method. Flow of the expansion coating method will be described with reference to FIG. 7.

(a) Tube Insertion

The PFA tube 24 is disposed, by using an externally fitting mechanism, inside (inserted into) a metal-made tube expansion mold K having an inner diameter larger than an outer diameter of a base material W ((b) of FIG. 2) including the silicone rubber layer as the elastic layer layer 22.

(b) Holding at End Portions

The PFA tube 24 disposed inside the expansion mold K is held (gripped) by holding members (holding tools or gripping tools) Fu and Fl at end portions. Specifically, the tube 24 is held at a longitudinal end portion by the holding member Fu and the other longitudinal end portion by the holding member Fl.

(c) Vacuum Expansion

Next, by a moving mechanism (shortening mechanism), the PFA tube was shortened (flexed) by a predetermined length obtained in advance with respect to a longitudinal direction. Specifically, the moving mechanism moves the holding members Fu and Fl in a PFA holding state, toward each other so that a distance between the two holding members Fu and Fl are decreased by a predetermined amount.

Thereafter, a portion of a gap (spacing) between the outer surface of the PFA tube 24 and the inner surface of the expansion mold K is placed in a vacuum state (state of negative pressure relative to ambient pressure. In the vacuum state (5 kPa), the PFA tube 24 is expanded in the radial direction, so that the outer surface of the PFA tube 24 intimately contacts the inner surface of the expansion mold K.

(d) Insertion of Base Material W

On a core N, the base material W (25, 21, 26, 22, 23) is set (externally fitted) by the externally fitting mechanism, and then the resultant structure is inserted into the expansion mold K inside which the PFA tube 24 is expanded. The surface of the silicone rubber layer 22 is uniformly applied (coated) with the addition curing type silicone rubber adhesive 23 in advance.

The inner diameter of the expansion mold K is not limited particularly when the inner diameter is in a range in which the insertion of the base material W is smoothly performed.

(e) Vacuum Elimination and Elongation

After the base material W is disposed in the expansion mold K, the vacuum state (state of the negative pressure relative to the ambient pressure) in which the gap portion between the outer surface of the PFA tube 24 and the inner surface of the expansion mold K is eliminated (removed). By eliminating the vacuum state, the increased diameter of the PFA tube 24 is decreased to a diameter which is the same as the outer diameter of the base material W including the silicone rubber layer 23, so that the PFA tube 24 and the surface of the silicone rubber layer 22 are placed in a state in which the surfaces thereof are intimately contacted to via the adhesive layer 23.

Next, the PFA tube 24 is elongated to a predetermined elongation (percentage) by an elongation mechanism (fluorine-containing resin tube elongation in longitudinal direction). Specifically, the elongating mechanism moves the holding members Fu and Fl in the PFA tube holding state, away from each other so that the distance between the holding members Fu and Fl is increased by a position distance.

When the PFA tube 24 is elongated, the addition curing type silicone rubber adhesive 23 disposed between the PFA resin tube 24 and the silicone rubber layer 22 performs the function of a lubricant, so that the PFA tube 24 can be smoothly elongated.

The longitudinal elongation of the PFA tube in this embodiment was 6% (on the basis of a full length of the fluorine-containing resin tube with which the cylindrical elastic layer is coated). By elongating the PFA tube 24 in the longitudinal direction, the PFA tube 24 does not readily generate creases thereon, so that the fixing belt having high durability is obtained.

The above-described steps (a) to (e) constitute a fluorine-containing resin (material) coating step.

(f) Calking Step (Temporary Fixing Step) Between Elastic Layer 22 and Fluorine-Containing Resin Tube 24

In this step, the elastic layer 22 and the PFA tube 24 are bonded (temporarily fixed) at longitudinal end portions in parallel in order to maintain the longitudinal elongation of the PFA tube 24 and also in order to prevent the PFA tube 24 from contracting in the longitudinal direction in a heating step (h) described later. Although details will be described later in (3-7), the PFA tube 24 is heated at the longitudinal end portions thereof by a calking bit (heating mechanism) in which a heater is incorporated, so that the elastic layer 22 and the PFA tube 24 are locally bonded by the addition curing type silicone rubber adhesive 23. A caulking portion (temporary fixing portion) of at least the longitudinal end portion of the PFA tube 24 is constituted such that a plurality of portions where the elastic layer 22 is to be bonded and a plurality of portions where the elastic layer 22 is not bonded are alternately provided.

(g) Squeezing Step

Between the elastic layer 22 and the PFA tube 24, the excessive addition curing type silicone rubber adhesive 23 which does not contribute to the bonding and the air taken (included) during the tube coating are present. This step is a step of squeezing (removing) the excessive adhesive and the air.

The base material W coated with the PFA tube 24 is taken out from the expansion mold K. A ring(-like) member (squeezing mechanism) R having an inner diameter slightly larger than an outer diameter of the base material W is externally fitted around the PFA tube 24 with which the base material W is coated. Then, the ring member R is slid from an upper end portion to a lower end portion of the PFA tube with which the base material W is coated. The ring member R is provided with many air nozzle holes at an inner peripheral surface thereof, and at this time, the air is jetted (at air pressure of 0.5 MPa) from these nozzle holes toward the surface of the PFA tube 24. The air jetting is made with respect to a radial direction directed toward the center of the PFA tube 24. That is, the ring member R is moved in the longitudinal direction while jetting the air.

As a result, the excessive addition curing type silicone rubber adhesive 23, which does not contribute to the bonding, and the air taken during the tube coating which are present between the elastic layer 22 and the PFA tube 24 are squeezed out (removed) (step of squeezing the coated adhesive).

As the squeezing method, other than the method using the air pressure, a liquid or semi-solid may also be jetted. Further, the squeezing may also be made by using an expanding and contracting ring having a diameter smaller than the outer diameter of the base material W coated with the PFA tube 24.

(h) Heating (Treatment)

After the squeezing step, by effecting heating (at 150° C. for 20 minutes in the electric furnace as the heating mechanism), the addition curing type silicone rubber adhesive 23 is cured as a whole. As a result, the PFA tube 24 and the elastic layer 22 are fixed over the entire region via the cured adhesive 23 (adhesive curing step).

(i) Cut and Abrasion

After the heating, the base material W (25, 21, 26, 22, 23, 24) is cut in a predetermined length by a cutting mechanism at end portions thereof. Specifically, the cutting mechanism cuts the base material W so that the longitudinal end portions of the resin tube, i.e., regions where the elastic layer 22 and the PFA tube 24 are temporarily fixed are cut away from the base material W. Thereafter, the cut surface was abraded, so that the fixing belt 20 was completed.

By such a series of manufacturing steps, a manufacturing process of the fixing belt 20 is completed.

(3-7) End Portion Bonding Method Between Elastic Layer 22 and Fluorine-Containing Resin Tube 24

The PFA tube 24 of the base material W after the above-described vacuum elimination and elongation step (e) in FIG. 7 is in a state in which the PFA tube 24 is elongated in the longitudinal direction by 6% and the silicone rubber layer 22 is coat with the PFA tube 24 via the adhesive 23, and therefore a force for returning the length of the PFA tube 24 to the original length is exerted on the PFA tube 24.

In order to maintain the force, the elastic layer 22 and the PFA tube 24 are bonded only at end portions. Each of the end portions is a portion which is within about 50 mm from an edge of the structure in which the elastic layer 22 is coated with the PFA tube 24 and which is to be cut away in the later step (i).

Between the elastic layer 22 and the PFA tube 24, the excessive addition curing type silicone rubber adhesive 23, which does not contribute to the bonding, and the air taken during the tube coating are present (located), and then are squeezed cut in the squeezing step (g).

Figure 1:
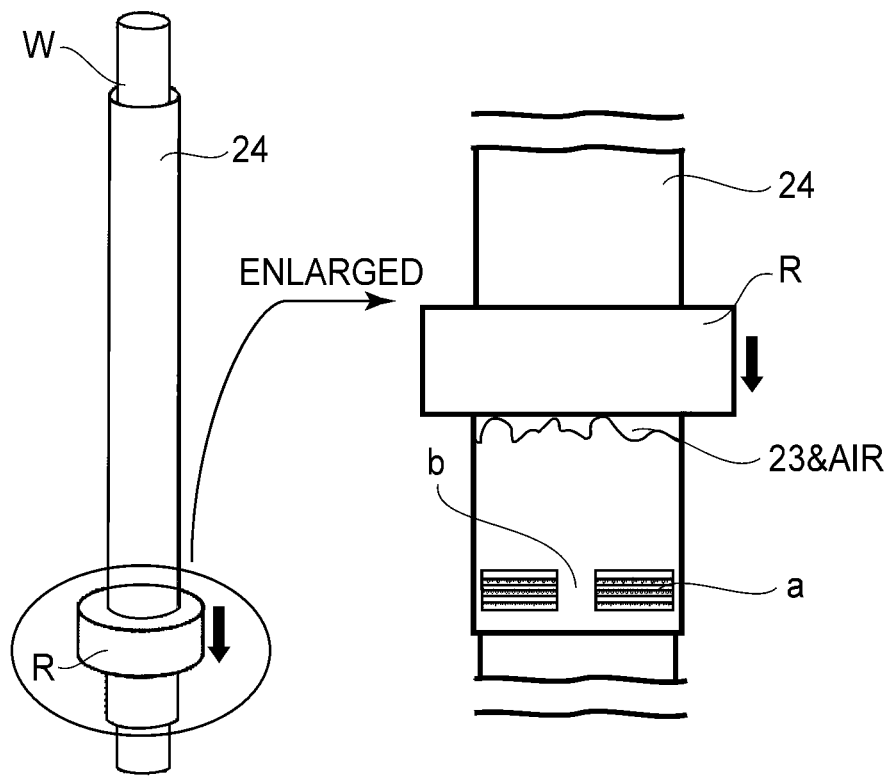
FIG. 1 is a schematic view for illustrating a portion where a fluorine-containing resin tube and an elastic layer are not bonded and a portion where the fluorine-containing resin tube and the elastic layer are bonded in Embodiment 1.

FIG. 1 is a schematic view showing a lower end portion (a longitudinal end portion of the tube 24 in a side where the adhesive is to be squeezed out) of the base material W coated with the PFA tube 24 during the squeezing by a ring(-like) member (squeezing ring) R. The air (air pressure: 0.5 MPa) is jetted (ejected) from the squeezing ring R toward the PFA tube with respect to a direction perpendicular to the circumferential direction of the PFA tube 24, and at the same time, the squeezing ring R is moved in the longitudinal direction from an upper end portion to the lower end portion of the PFA tube 24. As a result, the excessive addition curing type silicone rubber adhesive 23, which does not contribute to the bonding, and the air taken during the coating are squeezed out.

At the lower end portion of the PFA tube 24, by the caulking step (f), a portion (non-bonding portion) b were the PFA tube 24 is not bonded onto the elastic layer 22 (via the adhesive 23) and a portion (bonding portion) a where the PFA tube 24 is bonded onto the elastic layer 22 are continued with respect to the circumferential direction. That is, in the caulking step (f), the bonding portion a and the non-bonding portion b are provided alternately along the circumferential direction.

As shown in FIG. 1, the PFA tube 24 is squeezed from the upper end portion to the lower end portion with respect to the longitudinal direction thereof. For that reason, the excessive addition curing type silicone rubber adhesive 23, which does not contribute to the bonding, and the air taken during the coating are removed from the non-bonding portion b, at the lower end portion, where the elastic layer 22 and the PFA tube 24 are not bonded. In the case where the squeezing direction is from the lower end portion to the upper end portion, the non-bonding portion b and the bonding portion a are provided at the upper end portion with respect to the circumferential direction. Further, at a squeezing start end portion (at the upper end portion in the case where the squeezing is made from the upper end portion to the lower end portion), the bonding (temporary fixing) may be made over an entire circumferential region or a portion where the bonding (thickness fixing) is not made may also be provided.

FIG. 8 is a schematic view showing the lower end portion of the base material W coated with the PFA tube 24 after the squeezing step (g) in FIG. 7. At the bonding (bonded) portion a, the adhesive and the air which are unable to be squeezed out remain in a projected shape. When the adhesive and the air which are unable to be squeezed out remain inside the PFA tube 24, only the portion has a large thickness or is changed in thermal conductivity, thus resulting in a portion which cannot be used for a product.

In this embodiment, the base material 21 having a length of 420 mm was used, and a position where the coating of the base material 21 with the silicone rubber layer as the elastic layer 22 was started was 8 mm from the edge of the base material 21. Further, a position where the coating of the base material 21 with the silicone rubber layer as the elastic layer 22 was ended was 8 mm from the other edge, opposite from the edge in the coating start side, of the base material 21. The reason why the base material 21 is not coated with the silicone rubber layer 22 in an entire region thereof is that when the coating is made with respect to the entire region, there is a fear that the silicone rubber moves and enters the inside of the base material 21 and thus the core N cannot be inserted into the base material 21.

In this embodiment, the fixing belt 20 has a length of 368 mm. After the base material 21 coated with the PFA tube 24 is cut at the end portions (where the cylindrical elastic layer 22 and the fluorine-containing resin tube 24 are to be cut), the base material 21 is abraded by 1 mm at each of the edges thereof. Therefore, in this embodiment, the cutting position is 25 mm from each of the edges of the base material 21. At each cutting region, the elastic layer 22 is 17 mm in length, and in this range, the PFA tube 24 is to be bonded onto the elastic layer 22 by the adhesive 23.

The calking bit H1 in which the heater is incorporated has a height of 6 mm at a portion (where the elastic layer 22 and the PFA tube 24 are to be bonded) contacting the PFA tube 24. Further, as a margin, a height of 1 mm is intended to be ensured, and therefore the height of the adhesive and the air which cannot be squeezed out may preferably be suppressed within 10 mm.

A method of creating the non-bonding portion b and the bonding portion a between the elastic layer 22 and the PFA tube 24 along the circumferential direction will be described with reference to FIG. 9. FIG. 9 is a schematic top view for illustrating the caulking step. The calking bit H1 has an arcuate portion c, so that the PFA tube 24 follows along the base material W coated with the PFA tube 24. The arcuate portion c is provided with a cut-away portion d at a central portion thereof, and the cut-away portion d has a width H1k. The calking bit H1 is moved from outsides of the PFA tube 24 to sandwich the base material W coated with the PFA tube 24. When the PFA tube 24 is sandwiched, there is a portion e where the calking bit H1 does not contact the PFA tube 24, and the portion e has a width H1n.

The bonding portion a where the elastic layer 22 and the PFA tube 24 are bonded has a width H1w. In this embodiment, H1k was 15.0 mm, H1n was 18.5 mm, and H1w was about 27 mm. A portion where the calking bit H1 contacts the PFA tube 24 has a height of 6 mm. From this height and the width H1w of the bonding portion a. A bonding area of one bonding portion a is about 162 mm². There are 4 bonding portions a along the circumferential direction of the PFA tube 24, and therefore a total bonding area at the lower end portion is about 648 mm².

In this embodiment, as a calking bit used for bonding the elastic layer 22 and the PFA tube 24 at the upper end portion, the same calking bit H1 as that used for the bonding at the lower end portion was used. Therefore, also the total bonding area at the upper end portion is about 648 mm².

The longitudinal elongation of the PFA tube 24 during the expansion coating was 6%, but the caulking state was not eliminated (destroyed). After the squeezing step, when a height of the adhesive and the air which had the projected shape and which are usable to be squeezed out (hereinafter referred to as a "residual adhesive height") Sh1 was measured, the residual adhesive height Sh1 was about 9 mm at the maximum. However, this portion was located 2 mm below (toward the lower edge) the cutting position at the lower end portion, and therefore did not adversely affect a product region of the fixing belt 20.

(4) End Portion Bonding Method between Elastic Layer 22 and PFA Tube 24 in Comparison Example 1

In Comparison example 1, a calking bit H2 which was provided with no cut-away portion at a central portion of an arcuate portion thereof and which was capable of covering (sandwiching) the base material W coated with the PFA tube 24 in full circumference of the PFA tube 24 was used. Other constitutions are the same as those in this embodiment (Embodiment 1).

FIG. 10 is a schematic top view for illustrating the caulking step. The calking bit H2 has an arcuate portion c, so that the PFA tube 24 follows along the base material W coated with the PFA tube 24. Different from the calking bit H1, the arcuate portion c is provided with no cut-away portion at a central portion thereof. The calking bit H2 is moved from outsides of the PFA tube 24 to sandwich the base material W coated with the PFA tube 24. When the PFA tube 24 is sandwiched, the calking bit H2 contacts the PFA tube 24 through full circumference.

The bonding portion where the elastic layer 22 and the PFA tube 24 are bonded has a width H2w. In Comparison example 1, H2w was about 176 mm. A portion where the calking bit H2 contacts the PFA tube 24 has a height of 6 mm. From this height and the width H2w of the bonding portion. A bonding area of the bonding portion is about 1056 mm².

In Comparison example 1, as a calking bit used for bonding the elastic layer 22 and the PFA tube 24 at the upper end portion, the same calking bit H2 as that used for the bonding at the lower end portion was used. Therefore, also the total bonding area at the upper end portion is about 1056 mm².

The longitudinal elongation of the PFA tube 24 during the expansion coating was 6%, but the caulking state was not eliminated (destroyed). FIG. 11 is a schematic view showing a lower end portion of the base material W, coated with the PFA tube 24, after the squeezing step. When a residual adhesive height Sh2 was measured, the residual adhesive height Sh1 was about 14 mm at the maximum, and, this portion was located 3 mm above (toward the longitudinal central portion) the cutting position at the lower end portion, and therefore adversely affected a product region of the fixing belt 20. When the adhesive and the air which cannot be squeezed out are located in the production region, the thickness of the production region becomes large, so that the fixing belt 20 cannot be rotated stably. Further, the thermal conductively is changed and therefore the fixing belt 20 cannot be used as a product.

(5) Influence, on Fixing Belt 20, of Difference in Method of End Portion Bonding Between Elastic Layer 22 and Fluorine-Containing Resin Tube 24

An influence, on the fixing belt 20, of a difference of a method for bonding the fluorine-containing resin tube 24 onto the elastic layer 22, between Embodiment 1 and Comparison example 1 is summarized in Table 1.

TABLE 1

| EMB. | BPW*2 | BP*3 | CBH*4 | CA*5 | RAH*6 | IC*7 |
|---|---|---|---|---|---|---|
| EMB. 1 | ca.27 | 4 | 6 | ca.1296 | MAX. 9 | NO |
| CE1*1 | ca.176 | All | 6 | ca.2112 | MAX. 14 | RAP |

*1"CE1" represents Comparison example 1.
*2"BPW" represents the bonding portion width (mm).
*3"BP" represents the bonding portion. "4" shows that there are 4 bonding portions with respect to the circumferential direction. "All" shows that the calking bit contacts the PFA tube through full circumference.
*4"CBH" represents the calking bit height (mm).
*5"CA" represents the contact area (mm$_2$) in total at the upper and lower end portions.
*6"RAH" represents the residual adhesive height (mm) at the maximum.
*7"IC" represents an inconvenience. "NO" shows that there is no inconvenience. "RAP" shows that there is the remaining adhesive portion in the product region.

From the above result, it was found that this embodiment (Embodiment 1) was capable of reducing a defective production rate than Comparison example 1.

Embodiment 2

Embodiment 2 will be described. Constituent elements (members) identical in constitution to those in Embodiment 1 are represented by the same reference numerals or symbols as those in Embodiment 1 and will be omitted from detailed description. In this embodiment, the fixing belt manufacturing method in Embodiment 1 is applied to a pressing belt manufacturing method.

(1) Pressing Belt 30

In this embodiment, with respect to also a layer structure of the pressing belt 30, as the other fixing member of the fixing device, the same layer structure as that of the fixing belt 20 was employed. That is, similarly as in the layer structure of the fixing belt 20 shown in FIG. 2. The layer structure of the pressing belt 30 includes the base material 21, the elastic layer 22, the adhesive layer 23, the resin tube (fluorine-containing resin tube) 24 and the like. However, each of the base material 21, the elastic layer 22 and the fluorine-containing resin tube 24 is changed to a layer formed of an optimum material or member as that for the pressing belt 30.

(1-1) Base Material 21

As the base material 21 for the pressing belt 30, in this embodiment, an electroformed nickel belt of 55 mm in inner diameter and 50 μm in thickness is used. Similarly as in the fixing belt 20, the thickness of the base material 21 may preferably be 1-300 μm. When the thickness of the base material 21 is smaller than 1 μm, rigidity is low, and therefore it becomes difficult to withstand a durability test of a large number of sheets. Further, when the thickness of the base material 21 exceeds 300 μm, the rigidity becomes excessively high, and flexing resistance is lowered, so that use of the resultant belt as the rotatable belt member is not practical.

(1-2) Elastic Layer 22 and Manufacturing Method of Elastic Layer 22

Over the outer peripheral surface of the base material 21, the elastic layer 22 is provided via the primer layer 26. As a material for the elastic layer 22, a known elastic material can be used. For example, silicone rubber, fluorine-containing rubber and the like can be used. In this embodiment, silicone rubber is used as the material for the elastic layer 22, and the elastic layer 22 is 21 degrees in JIS-A hardness, 0.4 W/mk in thermal conductivity and 350 μm in thickness. As a coating method, similarly as in Embodiment 1, the so-called ring coating (method) was used.

In this embodiment, difference from Embodiment 1 in the step of forming the silicone rubber longitudinal 22 are as follows. That is, the differences are only the addition curing type silicone rubber composition, in which the addition curing type silicone rubber and the filler are mixed, charged into the cylinder pump 41 (FIG. 5), and a speed of movement of the base material 21 to be moved in the right direction in FIG. 5 at the certain speed simultaneously with the application (coating).

(1-3) Adhesive Layer 23

The adhesive layer 23 in this embodiment is the same as that in Embodiment 1.

(1-4) Fluorine-Containing Resin Tube 24 and Fluorine-Containing Resin Tube Coating Method In this embodiment, the PFA tube 24 obtained by the extrusion molding was used. A thickness of the rube was 40 μm. An inner diameter of the tube was smaller than an outer diameter of the elastic layer 22, and was 54 mm. An inner surface of the rube has been subjected to the ammonia treatment in order to improve the adhesive property. Further, the PFA tube 24 used in this embodiment was of a heat contraction type (in which the full length contracted by 3% when the PFA tube 24 was heated at 150° C. for 20 minutes). At the coating method, similarly as in Embodiment 1, the so-called expansion coating method was used.

In this embodiment, a difference from Embodiment 1 in fluorine-containing resin tube 24 coating step is only that a heat contraction type PFA tube 24 is used and the longitudinal elongation is changed to 3%.

(1-5) Caulking Step of Elastic Layer 22 and Fluorine-Containing Resin Tube 24

Although details of the caulking step in this embodiment will be described later, the caulking step is the same as that in Embodiment 1 except that a calking bit H4 in which a heater is incorporated is used.

(1-6) Squeezing Step, Heating, Cut and Abrasion

In this embodiment, the respective steps consisting of the squeezing step, the heating, and the cut and abrasion are the same as those in Embodiment 1.

(2) End Portion Bonding Method Between Elastic Layer 22 and Fluorine-Containing Resin Tube 24 in this Embodiment In this embodiment, the end portion bonding method is the same as that in Embodiment 1. With reference to FIG. 12, a difference between the calking bits H1 and H4 will be described. FIG. 12 is a schematic top view for illustrating the caulking step. The calking bit H4 is provided with cut-away portions d so that there are three portions e where the calking bit H4 does not contact the PFA tube 24 when the calking bit H4 is moved from outsides of the PFA tube 24 to sandwich the base material W coated with the PFA tube 24. Further, the calking bit H4 is processed so as to have a trapezoidal configuration at a portion where the calking bit H4 contacts the PFA tube 24.

FIG. 13 is a schematic view showing a lower end portion of the base material W coated with the PFA tube after the squeezing step. The trapezoidal bonding portion where the elastic layer 22 and the PFA tube 24 are bonded has an upper side H4Uw of about 28 mm and a lower side H4Lw of about 41 mm. A portion where the calking bit H4 contacts the PFA tube 24 has a height of 6 mm. Therefore, a bonding area of one trapezoidal bonding portion is about 207 mm$_2$. There are 3 bonding portions along the circumferential direction of the PFA tube 24, and therefore a total bonding area at the lower end portion is about 621 mm$_2$.

In this embodiment, as a calking bit used for bonding the elastic layer 22 and the PFA tube 24 at the upper end portion, the same calking bit H4 as that used for the bonding at the lower end portion was used. Therefore, also the total bonding area at the upper end portion is about 621 mm$_2$.

The longitudinal elongation of the PFA tube 24 during the expansion coating was 3% and then the longitudinal elongation was 3% after the heating, but the caulking state was not eliminated (destroyed). After the squeezing step, when residual adhesive height Sh4 was measured, the residual adhesive height Sh1 was about 9 mm at the maximum. However, this portion was located 2 mm below (toward the lower edge) the cutting position at the lower end portion, and therefore did not adversely affect a product region of the pressing belt 30.

From the above results, it was found that this embodiment (Embodiment 2) was, similarly as in Embodiment 1, capable of reducing the defective product rate.

Other Embodiments (1) In Embodiments 1 and 2, with respect to both of the fixing belt and the pressing belt as the fixing member, the endless belt member was described, but the fixing member is not limited thereto. As the fixing member, a roller-shaped member including a roller-shaped or hollow roller-shaped base substrate 21 having rigidity, the cylindrical elastic layer 22 formed over the outer peripheral surface of the base substrate, and the resin tube 24 coating over the surface of the elastic layer 22 may also be used.

(2) In the fixing device A, other than the device for fixing or temporarily fixing the unfixed toner image (visualized image or developer image) as a fixed image by heating the unfixed toner image by using the fixing member, also a device for modifying a surface property such as gloss by re-heating the fixed toner image is included.

While the invention has been described with reference to the structures disclosed herein, it is not confined to the details set forth and this application is intended to cover such modifications or changes as may come within the purpose of the improvements or the scope of the following claims.

This application claims priority from Japanese Patent Application No. 237944/2012 filed Oct. 29, 2012, which is hereby incorporated by reference.

What is claimed is:

1. A fixing member manufacturing method comprising:
   a first step of coating an outer peripheral surface of an elastic material with an adhesive;
   a second step of externally fitting a resin tube around the elastic material coated with the adhesive;
   a third step of temporarily fixing the resin tube onto the elastic material by heating the resin tube at a longitudinal end portion;
   a fourth step of temporarily fixing the resin tube onto the elastic material by heating the resin tube at another longitudinal end portion except for a circumferential part of the resin tube;
   a fifth step of squeezing out an excessive adhesive from between the elastic material and the resin tube, in a direction from the longitudinal end portion to said another longitudinal end portion of the resin tube; and
   a sixth step of fixing the resin tube onto the elastic material by heating the adhesive located between the elastic material and the resin tube.

2. The fixing member manufacturing method according to claim 1, further comprising a step of elongating the resin tube, externally fitted around the elastic material in said second step, in a longitudinal direction,
   wherein the resin tube is temporarily fixed onto the elastic material so that a state in which the resin tube is elongated in the longitudinal direction is maintained in said third step and said fourth step.

3. The fixing member manufacturing method according to claim 2, further comprising:
   a step of holding the resin tube at the longitudinal end portion by a first holding tool;
   a step of holding the resin tube at said another longitudinal end portion by a second holding tool; and
   a step of decreasing, before said elongating step, a distance between the first and second holding tools which hold the resin tube.

4. The fixing member manufacturing method according to claim 1, wherein said third step and said fourth step are performed in parallel.

5. The fixing member manufacturing method according to claim 1, wherein in said fourth step, at said another longitudinal end portion of the resin tube, a plurality of portions to be heated and a plurality of portions not to be heated are alternately formed with respect to a circumferential direction.

6. The fixing member manufacturing method according to claim 1, wherein in said third step, the resin tube is heated at the longitudinal end portion over a whole region with respect to a circumferential direction.

7. The fixing member manufacturing method according to claim 1, further comprising, after said sixth step, a step of cutting away a region where the resin tube is temporarily fixed onto the elastic material.

8. The fixing member manufacturing method according to claim 1, wherein the resin tube is a fluorine-containing resin tube.

9. The fixing member manufacturing method according to claim 8, wherein the fluorine-containing resin tube is a PFA tube.

* * * * *